(No Model.) 2 Sheets—Sheet 2.
E. THOMSON.
ELECTRIC METER.
No. 381,443. Patented Apr. 17, 1888.
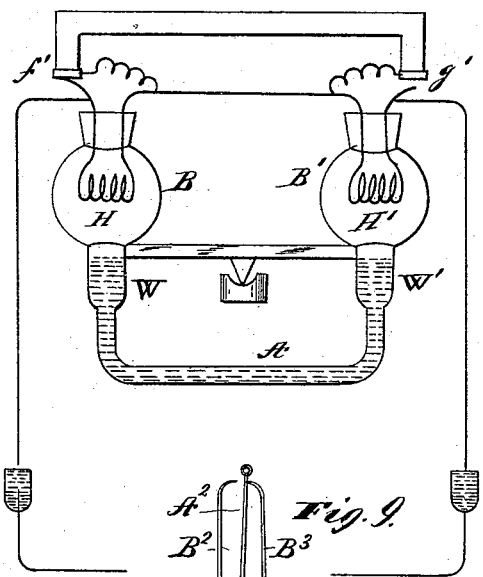
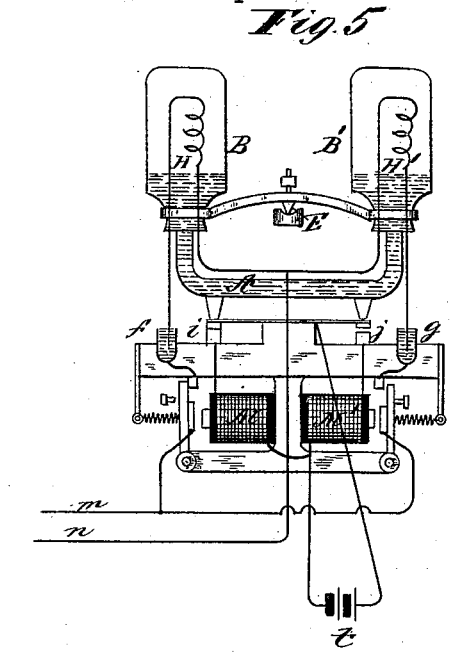
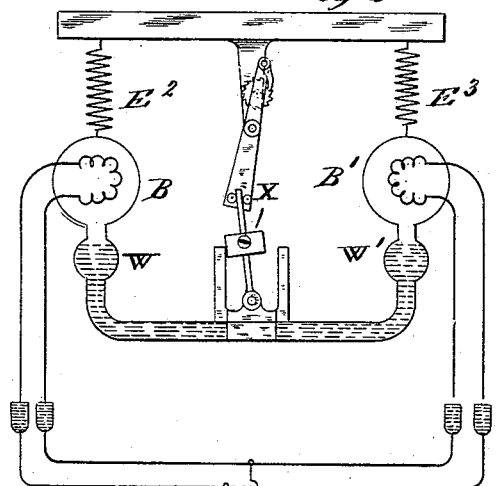
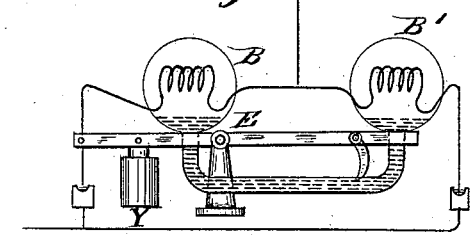
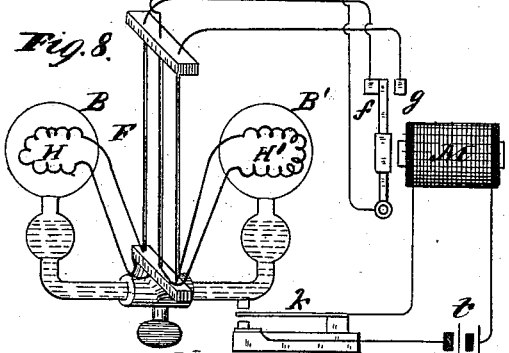
WITNESSES.
Gabriel J. W. Galster.
Wm H. Capel.
INVENTOR.
Elihu Thomson.
BY
Townsend & MacArthur.
ATTORNEYS.

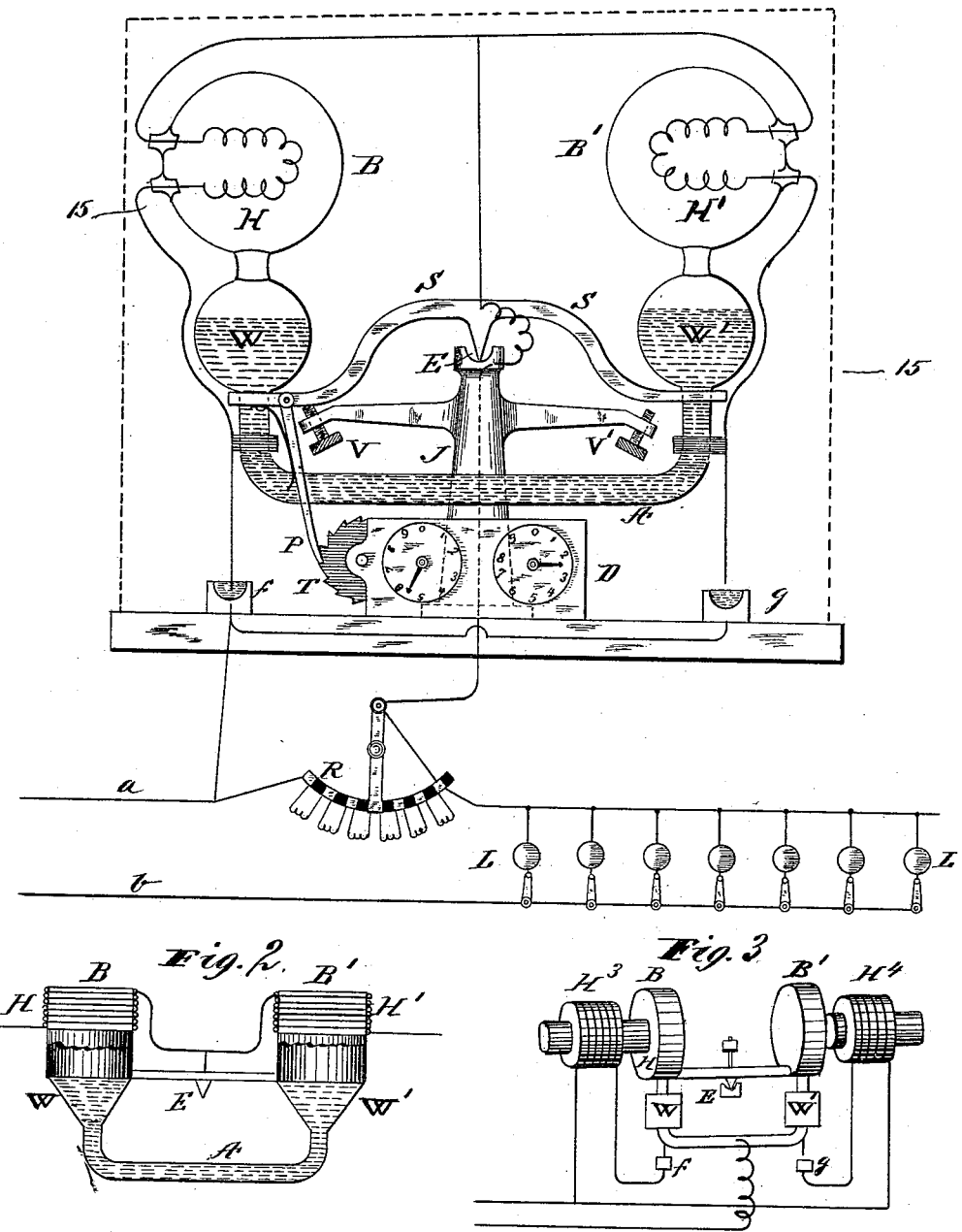

UNITED STATES PATENT OFFICE.

ELIHU THOMSON, OF LYNN, MASSACHUSETTS.

ELECTRIC METER.

SPECIFICATION forming part of Letters Patent No. 381,443, dated April 17, 1888.

Application filed December 31, 1887. Serial No. 259,448. (No model.)

*To all whom it may concern:*

Be it known that I, ELIHU THOMSON, a citizen of the United States, and a resident of Lynn, in the county of Essex and State of Massachusetts, have invented a certain new and useful Electric Meter, of which the following is a specification.

My invention relates to apparatus which may be employed either for the purpose of measuring electric currents or as a source of light motive power.

In carrying out my invention I utilize the heating effects of an electric current upon a confined body of some expansible fluid, and for the ordinary purposes of my invention I prefer to employ air or other gas, which, being heated directly or indirectly by such current, shall exert an expansive force, utilized as will be hereinafter described. I do not, however, confine myself to the use of air or gas in the manner hereinafter set forth, but may even employ an expansible liquid. The force of expansion of such fluid is utilized to produce movement of another body—such, for instance, as a body of liquid contained in a suitable receptacle and having the confined body of air, gas, or expansible liquid resting on its surface; or such body may consist of a suitable shiftable weight or other movable device acted upon directly or indirectly through suitable connections between the same and an expansible or yielding wall of a chamber containing the expansible fluid, liquid, or gas.

My invention consists, first, in the combination, with two or more chambers containing an expansible gas or liquid, of proper electric heaters for expanding the contents of the same and electric switches controlling the flow of current to said heaters, said switches being governed by the movement produced by the expansion of the gas or other fluid in such way as to cut off the flow of current to the heater by which the expansion and consequent movement of some part connected therewith are produced, and at the same time to admit the current to a heater whereby expansion may be produced in another chamber or receptacle.

My invention consists, further, in the combination, with an apparatus having its parts combined as just stated, of a suitable register whereby the number of movements of expansion may be indicated.

My invention consists, also, in the improved combinations of apparatus in which I employ a tilting or movable receptacle containing a liquid and having two chambers at opposite sides of its pivot containing each an expansible fluid—such as air or other gas—and electric heaters and switches whereby the fluid in the two bulbs may be alternately heated and a continued oscillating movement of the receptacle produced.

My invention consists, also, in the improved combinations of apparatus, which will be more specifically stated in the claims.

The electric heater may be of any desired description, and may consist of a coil or section of conductor which opposes a resistance to the flow of electric current, so as to be heated thereby, or the heating effects may be produced by changes of magnetic conditions or by the actions of induced currents induced by a primary current, as will hereinafter appear.

In the accompanying drawings, Figure 1 is a side elevation of an electric meter based on the principles of and embodying the elements of my present invention. Fig. 2 illustrates a modification in the manner of applying a heating-coil. Fig. 3 shows another way of heating the thermo-expansive element of the combination by means of an electric coil or conductor. Fig. 4 illustrates another modified form of my invention, and Fig. 5 illustrates a form in which electro-magnets are utilized to perform the switching operations. Fig. 6 shows another way of mounting the movable receptacle or movable frame which carries the shiftable weight. Fig. 7 illustrates another manner of mounting the fluid or liquid containing receptacles. Fig. 8 illustrates another form of the invention, in which an electro-magnetic switch is employed. Fig. 9 shows another form of my invention, in which the expansive force of the fluid is utilized to throw or move the weight, so as to change the center of gravity of the same and cause a movement of oscillation, which, by the employment of switches, as hereinafter described, may be utilized for the purposes of an electric meter, or might, as could the other forms of my invention, be used as an electric motor, in which constant movement of the parts would be maintained so long as current is supplied to the apparatus. Fig.

10 shows a mode of application of my invention.

In Fig. 1, B B' represent two bulbs or other forms of receptacle for the gas or other fluid, and H H' two heating coils or conductors, which are sealed in the bulb and carry the electric current that serves to heat the fluid contained in the receptacle. In the present instance the fluid operated upon so as to become the expansive operating element of the invention is supposed to be a gas—such as air—and in the form of the invention illustrated in Fig. 1 the current is supposed to be the whole or a definite portion of the current which is to be measured. The bulbs or chambers B B' are connected to one another by a tube or other passage, A, and a pair of minor bulbs or enlargements, W W', are applied at or near the ends of the tube A. The bulbs and tube hold a small body of liquid—such as water—though where the apparatus is liable to be exposed to a freezing temperature it is preferable to use a non-freezing liquid, such as sulphuric acid, or even alcohol. Other liquids might be used in place of the water. Upon the liquid, which is the shifting weight of the organization, rests the confined body of expansible gas contained in the bulb B or B'.

The whole structure formed of the tube A and the attached bulbs W W' B B' is suspended or mounted on a knife-edge or pivot at E, so that it may oscillate or move between stops V V' on the shifting of the body of liquid forming the shiftable weight. The center of gravity of the structure is preferably arranged so as to be either coincident with or directly over the suspension or pivotal point, thereby not interfering with, but rather facilitating, the tilting of the structure from side to side as the balance is disturbed.

The frame S supports the bulbs and tube, and is provided with any suitable mechanical device for imparting movement to a register or other indicator of the number of oscillations of the structure. In the present instance this device is shown as consisting of a pawl, P, carried by the frame and engaging with the first wheel, T, of a register, D, like a gas-meter register.

The connections to the coils H H' are made by sealing the conductors into the glass after the manner of an incandescent electric light, or through a suitable stopper or plug inserted air-tight into the openings in the wall of the receptacle. One terminal from each heating-coil is connected with a wire which is carried down through the standard J, preferably as indicated, to the circuit from which current is taken, and the remaining terminals of the coils are carried, respectively, to contacts which dip alternately into mercury-cups $fg$, or otherwise form an electric contact, so as to complete connection with the outgoing wire $a$, forming the continuation of the electric circuit. When the structure tilts so as to make connection with $f$, connection at $g$ is broken, and vice versa. By this means the coils may be brought alternately into the circuit.

L L indicate electric lamps or other devices the consumption of current in which is to be measured, and R indicates an artificial electric resistance, placed as shown, to divert a definite amount of current to the meter in obvious manner. When alternating currents are used, the meter coils or heaters might obviously be in the circuits of a secondary coil of an induction-coil whose primary would be in the lamp-circuit. This modification is indicated in Fig. 10. It is, however, described in prior applications for patent filed by me October 19, 1887, Serial Nos. 252,792 and 252,793.

The operation of the apparatus as thus constituted is as follows: The current which traverses the heating-coil, H or H', which is in circuit at any time will be in proportion to the number of lamps or the current taken by them. The current is made strong enough and the resistance of the heating-coils is such that with the smallest current or load to be measured— say one lamp—sufficient heat will be generated to cause an expansion of the fluid—such as gas or air—included in the bulb B or B', and thereby force some of the liquid from the bulb W or W' over to the other side of the structure, eventually causing the bulb system, which is delicately balanced, to tip from one side to the other. Thus, for instance, in the position shown the coil H is in circuit and the structure by the passage of current in said coil will be caused to tip to the other side, thereby breaking the circuit to coil H and bringing coil H' into circuit. At the same time the pawl P will be brought into engagement with a fresh tooth of the wheel T. Current will now flow in coil H' and cause an expansion of the fluid in the bulb B', thereby gradually forcing the liquid back to the other side of the structure, until finally the balance is again disturbed, thus causing the system to oscillate back to its original position and produce one movement of the register-wheel T. This movement continues indefinitely, and each complete oscillation to and fro is accompanied by a movement of the wheel T a definite distance.

I find that as more lamps are added at L and more current passes in the register the frequency of tipping increases in like proportion, or nearly enough for practical purposes, and the apparatus can be used as an effective electric meter.

In order to prevent errors of registration and irregularities of action from changes in the condition of the surrounding temperature of air, it is preferable to inclose the apparatus in a box or case to cut off air-currents. The case may be of glass, pottery, metal, or other material, and is indicated by the dotted lines 15, Fig. 1.

I do not limit myself to the employment of mercury-cups, as described, for switching the current into and out of the electric heater, as any other form of switching device and any other arrangement of circuits may be employed by which the current may be alternately caused to flow and to cease to flow in the heater.

I do not limit myself to the form of register indicated, as any other means for keeping a registry of the oscillations of the structure might be used.

The tube A might be a barometer-tube with bulbs B B' about two inches in diameter, and the coils or conductors H H' may be of platinum wire of rather small gage. The resistance R may be made adjustable to determine the best conditions of working.

The mode of pivoting or suspending the structure may also be modified, and the same purpose would be served if the bulbs or receptacles were arranged to move up and down in a vertical line alternately in response to the heating effects of the current.

In Fig. 2 the coils or conductors are applied externally, and the receptacles B B' are supposed to consist of thin copper closely wound on the exterior with the coils H H', which are of rather fine wire and applied in a single layer. The shiftable body of liquid occupies the conical bottom of the boxes, and the connecting-tube and the space above said shiftable liquid contains the expansible fluid, whether the same be another lighter fluid or, preferably, air or gas, whose rate of expansion is large as compared with the fluid.

In Fig. 3 another form of electric heater is used. In this case the coils or conductors carrying the current by which the heating effects are produced consist of electro-magnetic coils $H^3$ $H^4$, surrounding cores of iron which produce a magnetic field, which in turn induces in the sides of the boxes B B', of copper or other metal, electric currents which heat the boxes and the contained fluid, so as to expand the latter and produce the transfer operation before described. It will of course be understood that in this case the current which flows in the coil is an alternating or varying current that will produce the changes of magnetic condition necessary to the production of induced currents.

In the modification shown in Fig. 4 the current is switched from the heater by forming shunts around the heating conductor or coils H H', and the switch is formed by metallic contacts $f'$ $g'$, insulated from one another. These contacts are connected, respectively, to the circuit at one side of the heating-conductor, while contact-springs moving with the structure connect, respectively, with the circuit at the other side. When contact is made, a shunt-circuit of low resistance is formed around the heater-coil. The arrangement is here shown as such that if both contacts are open the current will pass in both heaters. The tilting or oscillation of the structure, as before produced by the alternate expansion of the gas in the receptacles H H', produces an alternate closure of contact at $f'$ $g'$ and the continued operation of the apparatus in obvious manner. The connection to the heater is in this figure shown as effected through stoppers inserted in the bulbs at their tops.

In Fig. 5 the bulbs or receptacles are shown as consisting of inverted bottles containing at their lower ends the shiftable liquid. The stoppers hold the ends of the tube A and the wires leading to the conductors H H'. One terminal of each coil or conductor is connected to a common wire, $n$, while the other terminals are arranged to dip into the mercury-cups $f\,g$, from which they never rise sufficiently to break contact. At $i\,j$ are two spring keys or circuit-closers, with which a part of the oscillating structure engages alternately to close the connection as the bulbs tilt or oscillate on their support. The keys or circuit closers $i\,j$ serve to close circuit, respectively, from a battery, $t$, or other generator of electricity through electro-magnets M M', and these magnets in turn operate upon their armatures so as to close connections from the mercury-cups at $f\,g$ to the continuation $m$ of the circuit. When magnet M is put into circuit, it attracts its armature and closes a contact from wire $m$ to the cup $f$, which circuit was open, owing to the fact that the armature of the electro-magnet M is normally retracted. Electro-magnet M' similarly establishes connection from $m$ to the cup at $g$. The armatures of the electro-magnets obviously operate as electric switches. By this means a firm closure of the circuit through the electric heater is obtained at every change of connection and uncertainty of contact at the mercury-cups is avoided.

In Fig. 6 the structure is suspended by delicate coil-springs $E^2$ $E^3$, attached to opposite ends of the same, as indicated. When the liquid is shifted, the end of the structure to which the liquid is forced becomes the heavier and falls when overcoming the tension of its spring slightly, the effect being substantially as if the structure were pivoted and an oscillation taking place, as before. The connection may be rendered more positive by means of a weight, X, pivoted to the structure, as shown, and limited in its swing on its pivot by stops, as indicated. As the structure tilts one way or the other, the weight X tilts with it and falls to that side which is depressed, thereby increasing the movement and insuring the retention of the structure in the position last assumed until the transfer of the liquid weight in the opposite direction is produced by the action of the electric heater. The shifting lever carrying the weight X might also carry a pawl for operating on the wheel of a register.

In the modification indicated in Fig. 7 the pivotal point E of the structure is at one side or near one of the bulbs or receptacles B B', and a balancing-weight, Y, is used in order to produce substantial equilibrium until a transfer of the liquid is brought about. The operation is the same as in the other cases.

In Fig. 8 the structure is suspended by three metal wires or strips, F. The middle wire or strip connects to one of the terminals of the two coils, the other terminals of said coils being connected, respectively, to the fixed contacts $f$ and $g$ through the other two wires or supports F. The armature of an electro-magnet, M, plays between the two contacts $f$ $g$ and operates as an electric switch to transfer the current from the wire $m$ to one or the other of the heaters, as the action of the apparatus may require. For varying the magnet M a spring contact or key, $k$, is arranged in the path of the oscillating structure and serves to close the circuit of a battery, $t$, through the electro-magnet M when the structure oscillates in one direction and to open said circuit when oscillation or movement of the liquid and structure takes place in the opposite direction. When the circuit is open, the armature of the magnet M rests on the contact $f$, thereby closing the circuit from $m$ to the heater H. When through the expansion of the gas or air in bulb B the structure is made to operate in the opposite direction, the switch $k$ closes, thereby energizing the magnet M and closing the circuit at the contact $g$, so as to bring into circuit the heater for bulb B′, and causing a shift of the liquid in the opposite direction, so as to permit the switch $k$ to open.

In the form of my invention shown in Fig. 9 the force of the expanding fluid is utilized directly upon the flexible top of the receptacle B or B′, which top is of thin metal, like the side of an aneroid-barometer. In this case, as before, I preferably use gas or air as the fluid, though it is obvious that a liquid having a considerable co-efficient of expansion might be employed. The expansive force is applied to bell-crank levers $B^2$ $B^3$ to shift a weight attached to the end of a tilting rod or lever, $C^3$, and thereby to produce oscillation of the structure carrying said lever and boxes or receptacles B B′, the whole structure being pivoted, as before, and working between suitable stops. Suitable limiting-stops are also used for the lever $C^3$, as indicated.

The operation of the apparatus will be obvious from the foregoing description.

The heating-coils H H′ are best made of some metal whose resistance does not greatly change by change of temperature, and in such cases the resistance R should likewise be of such material. When the coils are of platinum or subject to change of resistance by temperature, the coil R or resistance should be of similar construction. In fact, since with many lamps at L L in use the coils H H′ may even become alternately red-hot, the resistance R must be made so small in gage of wire as to be similarly rendered hot by its own current. Variations in these respects may be used to vary the effects of registry or the proportional registry under different loads, so as to obtain any desired results.

What I claim as my invention is—

1. The combination, with two confined bodies of fluid contained in separate chambers, of a shiftable pivoted or tilting weight controlled in its position by the expansions of said fluid, electric heaters for expanding the same, and switches controlled by the movements of the shiftable weight for shifting the electric current to the heaters alternately, as and for the purpose described.

2. In an electric meter, the combination, with separate confined bodies of expansible fluid, of electric heaters for heating the same, a register of the expansions of said fluid, and electric switches governing the flow of current to the heaters and controlled by such expansions, as and for the purpose set forth.

3. The combination, substantially as described, of a body of liquid contained in a pivoted or movable receptacle and interposed between two gas-chambers, electric heaters for causing expansion of the gas in said chambers alternately and consequent movement of the body of interposed liquid, and electric switch devices controlled by the movement thus produced for bringing the heaters alternately into action, as and for the purpose described.

4. An electric meter consisting of a pivoted tilting receptacle comprising air or gas boxes or bulbs connected by spaces containing a body of liquid, heating-coils for causing expansion of the gas and consequent movement of the liquid, electric switch devices controlled by the movements of the receptacle for throwing the heating-coils into and out of action alternately, and an automatic register of the number of oscillations or movements.

5. In an electro-thermo-expansion device, a closed receptacle of metal containing a fluid of any character susceptible to heat and an electro-magnetic coil adapted to act inductively on the metal of the receptacle to develop heating electric currents in said metal.

6. The combination, with a pivoted or tilting receptacle containing a shiftable body of liquid, of electric switch devices mechanically operated by said receptacle, and an electro-magnetically-controlled switch governed by the latter, and in turn controlling the electric heater by whose heating effects a movement of the liquid bodily is induced.

7. The combination, with two confined bodies of fluid contained in chambers forming a pivoted or tilting structure, of a shiftable weight moved by the expansive force of said fluid, electric heaters for causing expansion of the fluid, and switches controlled by the movements of the tilting structure for shifting the electric current, as and for the purpose described.

Signed at Lynn, in the county of Essex and State of Massachusetts, this 22d day of December, A. D. 1887.

ELIHU THOMSON.

Witnesses:
WALTER C. FISH,
OTIS K. STUART.